United States Patent [19]

Bruhnke et al.

[11] Patent Number: 5,358,756
[45] Date of Patent: Oct. 25, 1994

[54] MOTOR VEHICLE VENEERED INTERIOR TRIM COMPONENT AND METHOD OF ASSEMBLY THEREOF

[75] Inventors: Ulrich Bruhnke, Ehningen; Andreas Kellermann, Weil der Stadt; Jürgen Körber, Sindelfingen, all of Fed. Rep. of Germany

[73] Assignee: Mercedes-Benz AG, Fed. Rep. of Germany

[21] Appl. No.: 89,178

[22] Filed: Jul. 12, 1993

[30] Foreign Application Priority Data

Jul. 15, 1992 [DE] Fed. Rep. of Germany ....... 4223236

[51] Int. Cl.$^5$ ............................................. B32B 3/10
[52] U.S. Cl. ..................................... 428/40; 428/138; 428/455; 156/60; 156/61
[58] Field of Search ................. 428/40, 138, 455, 137; 156/60, 61

[56] References Cited

U.S. PATENT DOCUMENTS 3,423,276  1/1969  Eckenroth ................... 428/39

FOREIGN PATENT DOCUMENTS 916126   8/1954  Fed. Rep. of Germany .
518252   2/1940  United Kingdom .
1158423  7/1969  United Kingdom .
1186607  4/1970  United Kingdom .
2249522  5/1992  United Kingdom .

OTHER PUBLICATIONS

Chemische Werke Worms-Weinsheim GmbH, Jan. 17, 1968, 5 pages.

Primary Examiner—Alexander S. Thomas
Attorney, Agent, or Firm—Evenson, McKeown, Edwards & Lenahan

[57] ABSTRACT

In veneered components for the body interior of motor vehicles, in particular for the interior of motor cars, the components are provided on the exposed side of the base part with a thin, decorative cover layer, firmly adhering thereto, of a peelable natural material. The cover layer consists of natural cork. Veneered components for the body interior of motor vehicles are thus provided which have a good visual appearance and the trim parts are pleasant to the touch.

4 Claims, 1 Drawing Sheet

MOTOR VEHICLE VENEERED INTERIOR TRIM COMPONENT AND METHOD OF ASSEMBLY THEREOF

BACKGROUND AND SUMMARY OF THE INVENTION

The present invention relates to a veneered component and method for assembly thereof for the body interior of motor vehicles, and, more particularly, to a component for motor car interiors in which the exposed side of the component base part is provided with a thin, decorative layer to which a peelable natural material is firmly adhered.

The interiors of motor vehicles contain a wide variety of trim elements such as pillar linings or dashboards. In order to provide the interior with a more visually attractive appearance, it is nowadays widely customary to line these trim elements with plastic. Their basic body is thereby no longer visible and the trim elements and equipment obtain a better visual appearance and feel more pleasant to the touch.

U.S. Pat. No. 3,423,276 shows, for example, instrument panels in motor vehicles coated with a decorative cover material of wood as a lining. Wood is, however, relatively expensive to process because wood veneer "leaves" tear easily on bending and because they require elaborate surface treatment.

German Patent No. 916,126 alludes to the use of cork for thermal insulation in refrigerators. An insulating-material foil is discussed in German Utility Model No. 1,989,628 in which the insulation-active use layers laminated onto the foil can consist, inter alia, of a cork felt, but requires relatively thick layers of cork or cork pieces for a completely different kind of use from that to which the present invention is directed.

An object of the present invention is based on the recognition that a component with an applied decorative layer for the body interior of motor vehicles can be provided such that the decorative layer is economical to produce, adheres firmly to the surface of the component, provides the component with a good visual appearance and itself feels pleasant to the touch.

The foregoing object has been achieved according to the present invention by providing that the thickness of the cover layer is sized such that pores in the cover layer are holes that completely penetrate the cover layer and allow a surface of the base part disposed below the cover layer to be visible, and the cover layer is adhesively bonded with a clear transparent adhesive onto the surface of the base part which has been painted in a uniform hue contrasting with the hue of the natural cork cover layer. The use of cork veneer allows simple treatment of the interior fitting part because the cork veneer is more flexible and does not require complex post-treatment.

The cover layer for the component is configured with a thickness dimension such that the pores in the cork cover layer are formed as holes which completely penetrate the cover layer and allow the surface of the base part, which has advantageously been painted in a uniform hue before application of the cover layer and is disposed below the cover layer, to become visible. The cover layer in a currently preferred embodiment is adhesively bonded onto the surface of the base part using a clear transparent adhesive.

During painting of the component, the surface thereof is provided with a hue of contrasting color to the basic hue of the cover layer. The base parts onto which the natural cork cover layer is applied consist of a natural solid wood, laminated plywood, laminated wood, sheet metal, die-cast light metal, solid plastic, foam plastic or any other suitable material. For reasons of price, the cover layer applied onto the base part can advantageously consist of pressed natural cork particles.

The veneered components are in practice usually produced by surface adhesion bonding (or laminating) a cork veneer onto a prefabricated base part. It is also possible, however, to bring the cork veneer into the desired shape and to fasten it temporarily over its full surface on a correspondingly shaped molding tool and then to apply the base part consisting of a molding compound onto the reverse side of the cork veneer. This latter approach can be suitably carried out by injection molding or foaming a backing in a closed molding tool, free-forming blowing of a backing by way of powder, granules or a particle composition, wherein the particles firmly adhere after deposition or compression-molding a backing of an initially loose filling of a particle composition in a molding/pressing tool.

BRIEF DESCRIPTION OF THE DRAWINGS

These and other objects, advantages and features of the present invention will become more readily apparent from the following detailed description thereof when taken in conjunction with the accompanying drawings wherein.

DETAILED DESCRIPTION OF THE DRAWINGS

Figure 1:
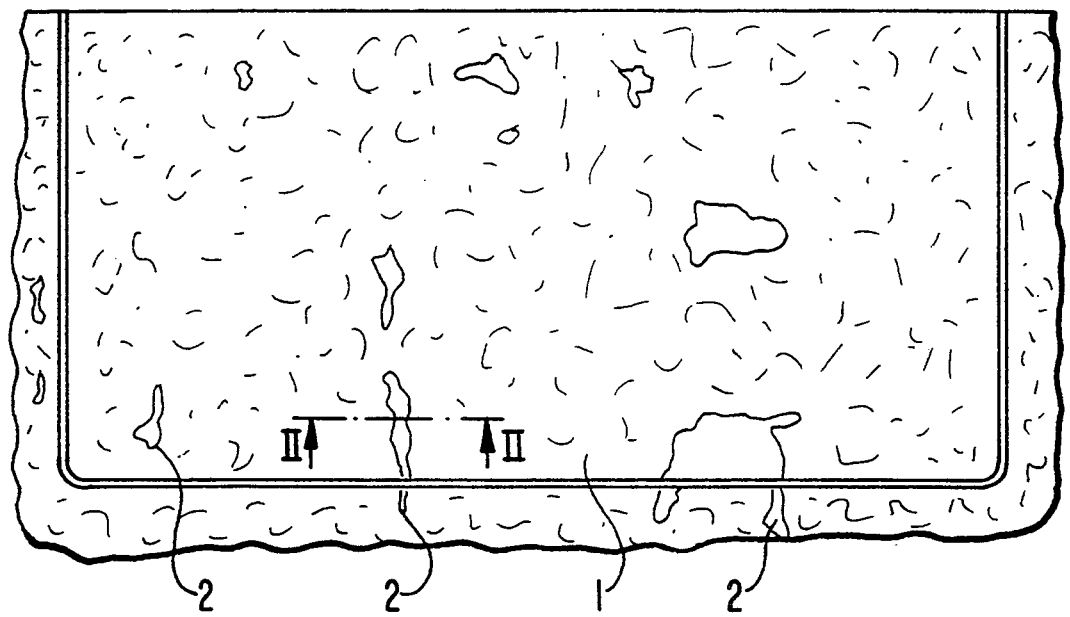
FIG. 1 is a plan view of a veneered component in accordance with the present invention.
Figure 2:
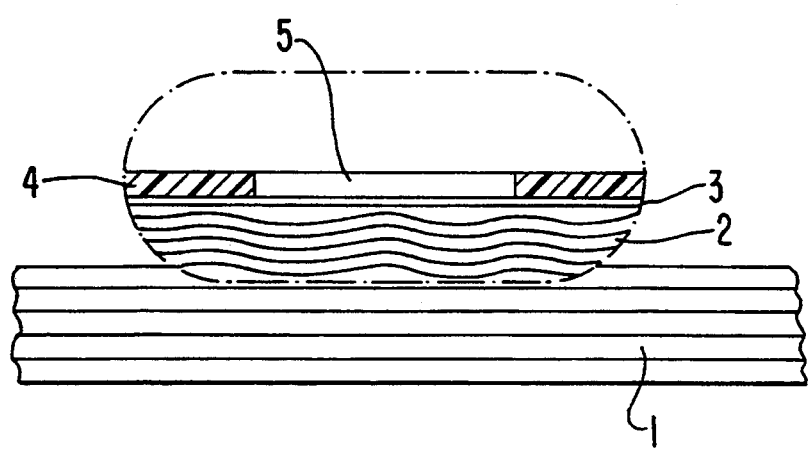
FIG. 2 is a sectional view along line II—II in the veneered component of FIG. 1.

In FIG. 1, the cover layer of natural cork is designated by the numeral 1, and the pores in the cover layer 1 are designated by the numeral 2. The pores 2 are formed as holes completely penetrating the cover layer and allow the uniform hue of the base part to become visible. The base part or component shown in FIG. 2 is made, for example, of a natural solid wood. The base part 1 has a topmost layer 2 (shown magnified in the oval area in dot-dash lines) and a layer of paint 3 applied to the topmost layer 2 of the basic part or component. The cover layer 4 (designated by the numeral 1 in FIG. 1) applied onto the paint layer 3 of natural cork with one of the pores 5 in the cover layer 4 shown in the magnified area.

The advantages achieved with the present invention are, in particular, the cost advantages of the cork-veneered parts compared with the wood-veneered parts, because the cork veneer is cheaper than the wood veneer and because the cork veneer, due to its higher flexibility and softness, is easier, and therefore more cost-effective, to process than the comparatively rigid, surface-sensitive wood veneer which tends to form cracks and to splinter. As regards the visual impression, cork veneer resembles a root wood veneer. In addition, because of its softness, cork veneer is more pleasant to the touch and feel than wood veneer.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A veneered component for a motor vehicle body interior, comprising a base part and a thin, peelable decorative natural cork cover layer provided on an exposed side of the base part so as to be firmly adhered thereon, wherein the thickness of the cover layer is sized such that pores in the natural cork cover layer are holes completely penetrating the cover layer and allowing a surface of the base part disposed below the cover layer to be visible, and the cover layer is arranged in an adhesively bonded manner, via a clear transparent adhesive, on the surface of the base part which has been painted in a uniform hue contrasting with the hue of the natural cork cover layer.

2. The veneered component according to claim 1, wherein the base part onto which the natural cork cover layer is applied consist of one of a natural solid wood, laminated plywood, laminated wood, sheet metal, die-cast light metal, solid plastic and foam plastic.

3. The veneered component according to claim 1, wherein the cover layer is comprised of pressed natural cork particles.

4. A method of making a veneered component for a motor vehicle body interior, comprising the steps of applying to a surface of a base portion of the component a paint of uniform hue which contrasts with a hue of a natural cork cover layer sized such that pores in the cover layer completely penetrate the cover layer, and adhesively bonding the cover layer to the base portion with a clear transparent adhesive such that the surface of the base part painted with the uniform hue is visible through the pores of the cover layer and contrasts with the hue of the natural cork cover layer.

* * * * *